US012462355B2

(12) United States Patent
Shirai

(10) Patent No.: US 12,462,355 B2
(45) Date of Patent: Nov. 4, 2025

(54) IMAGE PROCESSING DEVICE AND IMAGE PROCESSING METHOD

(71) Applicant: CANON KABUSHIKI KAISHA, Tokyo (JP)

(72) Inventor: Kunihiro Shirai, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 141 days.

(21) Appl. No.: 18/536,320

(22) Filed: Dec. 12, 2023

(65) Prior Publication Data
US 2024/0193744 A1 Jun. 13, 2024

(30) Foreign Application Priority Data
Dec. 13, 2022 (JP) ................................. 2022-198374

(51) Int. Cl.
*G06T 5/73* (2024.01)
*G06T 7/00* (2017.01)
*G06T 7/20* (2017.01)
*G06T 11/00* (2006.01)

(52) U.S. Cl.
CPC ............... *G06T 5/73* (2024.01); *G06T 7/0002* (2013.01); *G06T 7/20* (2013.01); *G06T 11/00* (2013.01); *G06T 2207/20201* (2013.01); *G06T 2207/30168* (2013.01)

(58) Field of Classification Search
CPC ........... G06T 5/73; G06T 7/0002; G06T 7/20; G06T 11/00; G06T 2207/20201; G06T 2207/30168; G06T 2207/20221; G06T 3/4038; G06T 3/608; G06T 15/00; G06F 3/1407
See application file for complete search history.

(56) References Cited

U.S. PATENT DOCUMENTS

2016/0267720 A1* 9/2016 Mandella ............ G06F 3/03545
2020/0309516 A1* 10/2020 Wakabayashi ......... B25J 19/022

FOREIGN PATENT DOCUMENTS

| JP | 2014-203326 A | 10/2014 |
| JP | 2018-028572 A | 2/2018 |
| WO | 2020-213555 A1 | 10/2020 |

* cited by examiner

*Primary Examiner* — Daniel F Hajnik
*Assistant Examiner* — Thomas John Foster
(74) *Attorney, Agent, or Firm* — Carter, DeLuca & Farrell LLP

(57) ABSTRACT

An image processing device includes: a display control unit that controls a display device to display a composite image obtained by combining an image of a virtual object with a captured image captured by an imaging device; an acquisition unit that acquires a combination position for combining the image of the virtual object in the captured image; an image processing unit that subjects the image of the virtual object to image processing, based on information on image deterioration of the captured image at the combination position; and a control unit that controls the image processing according to a motion amount of the display device.

11 Claims, 12 Drawing Sheets

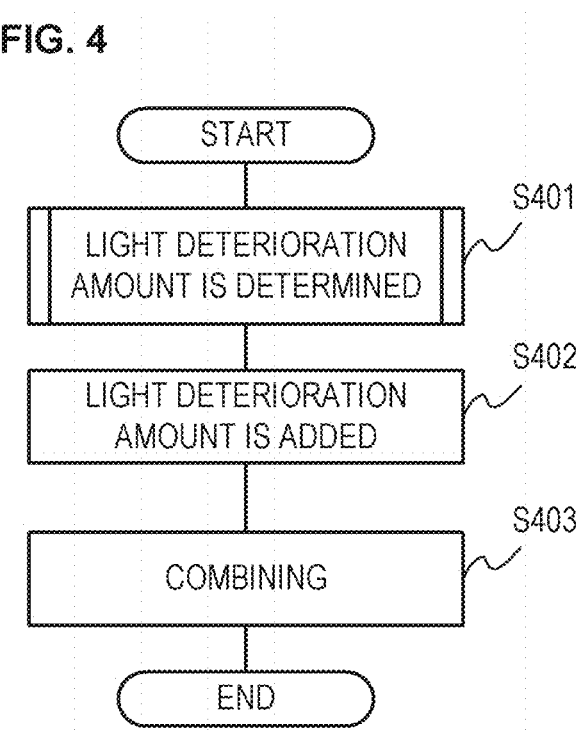

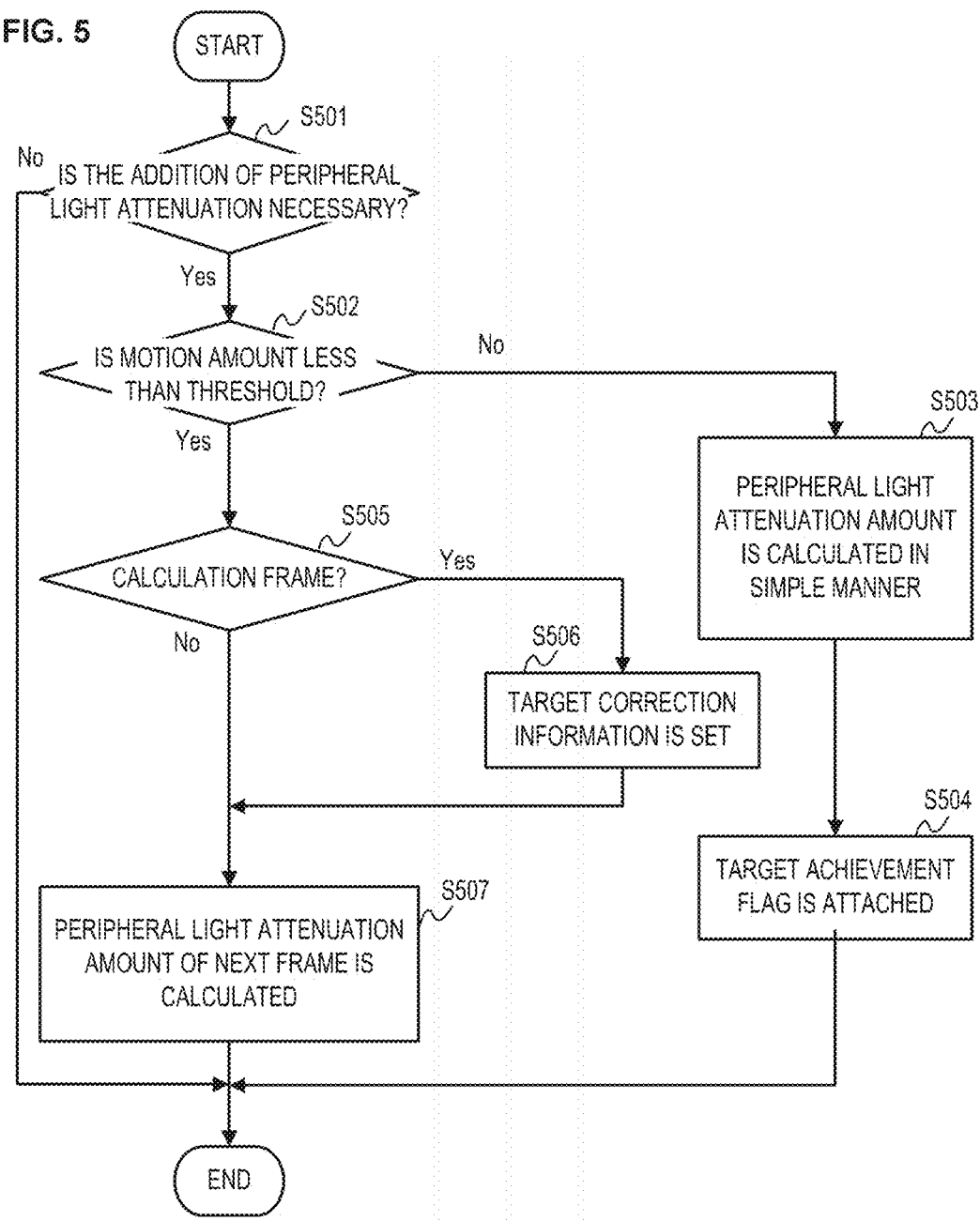

801

802  803

1001
1002

1003
1004

1005
1006

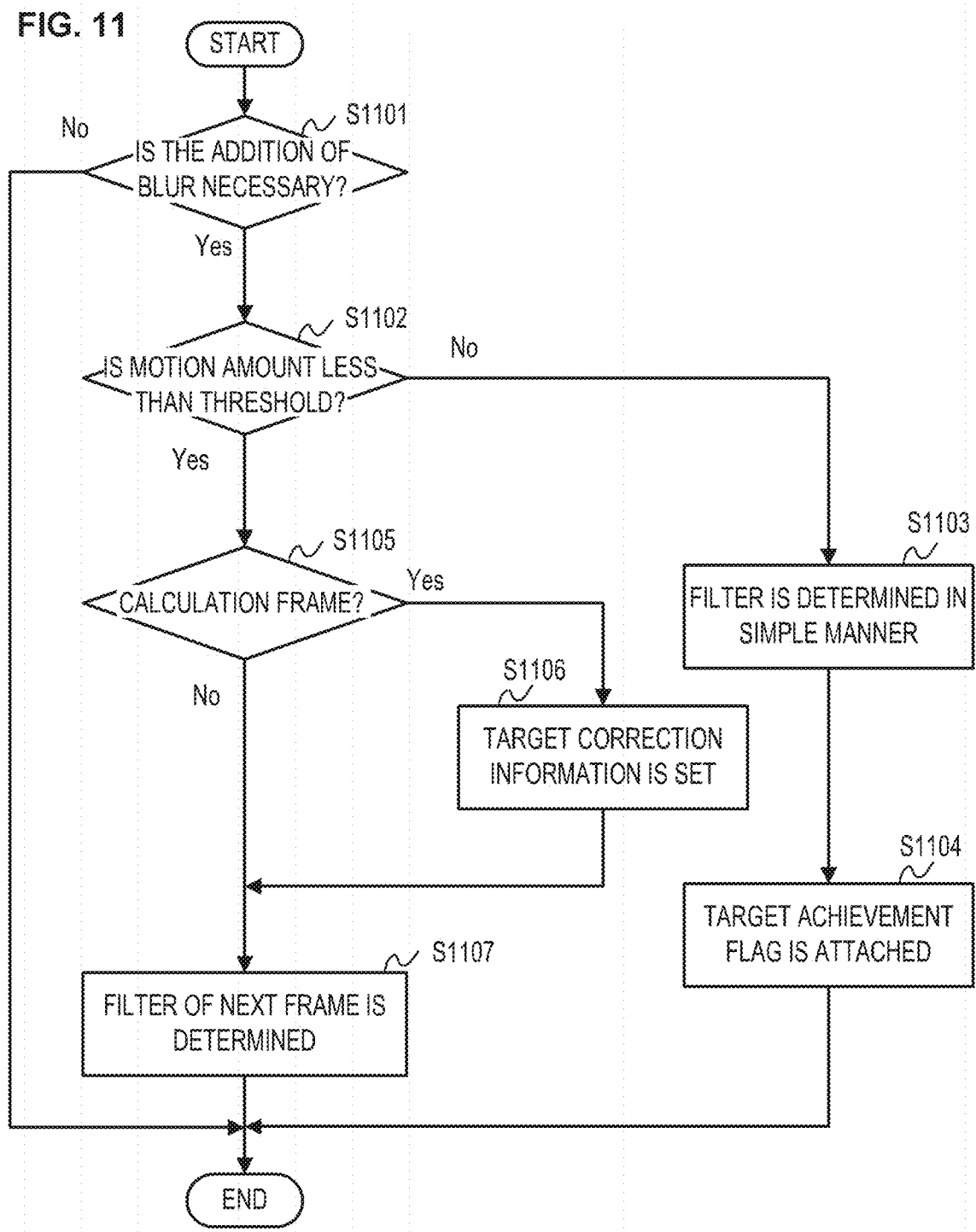

| AREA | REFERENCE FILTER |
|---|---|
| AREA 1201 | None |
| AREA 1202 | A |
| AREA 1203 | B |

| 1/16 | 2/16 | 1/16 |
|---|---|---|
| 2/16 | 4/16 | 2/16 |
| 1/16 | 2/16 | 1/16 |

| 1/256 | 4/256 | 6/256 | 4/256 | 1/256 |
|---|---|---|---|---|
| 4/256 | 16/256 | 24/256 | 16/256 | 4/256 |
| 6/256 | 24/256 | 36/256 | 24/256 | 6/256 |
| 4/256 | 16/256 | 24/256 | 16/256 | 4/256 |
| 1/256 | 4/256 | 6/256 | 4/256 | 1/256 |

IMAGE PROCESSING DEVICE AND IMAGE PROCESSING METHOD

BACKGROUND OF THE INVENTION

Field of the Invention

The present invention relates to an image processing device and an image processing method.

Description of the Related Art

In recent years, MR (Mixed Reality) technology that seamlessly fuses the real world and virtual world in real time has become known. For example, using a video see-through type HMD (Head Mounted Display), a video camera or the like captures an image of an object that substantially matches an object observed from the pupil position of the HMD user. Then, an image (composite image) obtained by combining CG (Computer Graphics) with the captured image is provided to the HMD user.

Here, when combining a CG image (virtual object image) with a captured image, where the CG image and the captured image are not consistent, the resulting composite image will become unnatural. For example, where the captured image that has been captured by a camera is blurred when the user is shaking his head, but the CG is not blurred, an unnatural-looking composite image will be generated.

With this in view, Japanese Patent Application Laid-open 2018-28572 describes a technique for adding blur to a CG image according to the movement of the HMD and the distance between the HMD and the CG.

However, with the technique described in Japanese Patent Application Laid-open 2018-28572, where image quality deterioration due to the imaging optical system occurs in the captured image (more specifically, where blurring or light intensity drop occurs), the blurring or light intensity drop is not taken into account in the CG. For this reason, where the images are combined as they are, the resulting image will create a sense of discomfort.

SUMMARY OF THE INVENTION

Therefore, an object of the present invention is to reduce the sense of discomfort when a user visually recognizes an image obtained by combining a virtual object with a captured image.

An aspect of the invention is an image processing device including at least one memory and at least one processor which function as: a display control unit configured to control a display device to display a composite image obtained by combining an image of a virtual object with a captured image captured by an imaging device; an acquisition unit configured to acquire a combination position for combining the image of the virtual object in the captured image; an image processing unit configured to perform image processing on the image of the virtual object, the image processing being based on information on image deterioration of the captured image at the combination position; and a control unit configured to control the image processing according to a motion amount of the display device.

An aspect of the invention is an image processing method including: controlling a display device to display a composite image obtained by combining an image of a virtual object with a captured image captured by an imaging device; acquiring a combination position for combining the image of the virtual object in the captured image; performing image processing on the image of the virtual object, the image processing being based on information on image deterioration of the captured image at the combination position; and controlling the image processing according to a motion amount of the display device.

Further features of the present invention will become apparent from the following description of exemplary embodiments with reference to the attached drawings.

BRIEF DESCRIPTION OF THE DRAWINGS

FIG. 4 is a flowchart of the composite image generation process according to Embodiment 1;

FIG. 5 is a flowchart of the optical deterioration amount determination process according to Embodiment 1;

FIG. 11 is a flowchart of the optical deterioration amount determination process according to Embodiment 2.

DESCRIPTION OF THE EMBODIMENTS

Figure 2A:
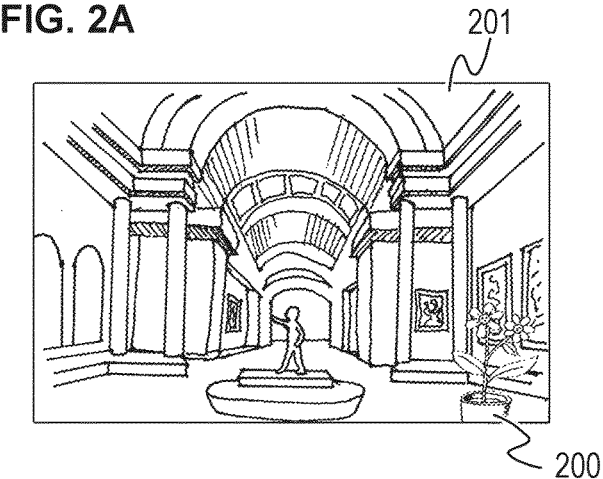
FIGS. 2A to 2C illustrate the sense of discomfort that the composite image gives to the user.
Figure 2B:
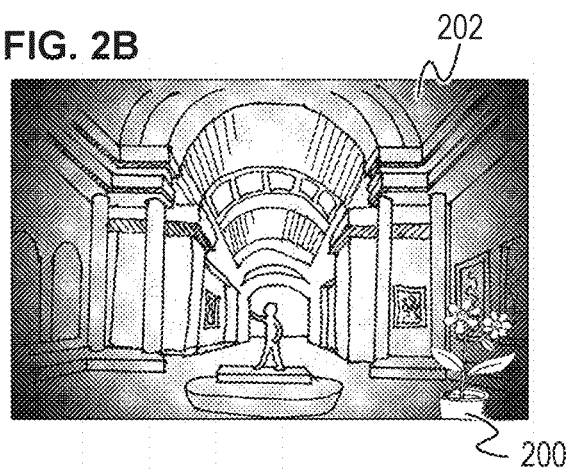
Figure 2C:
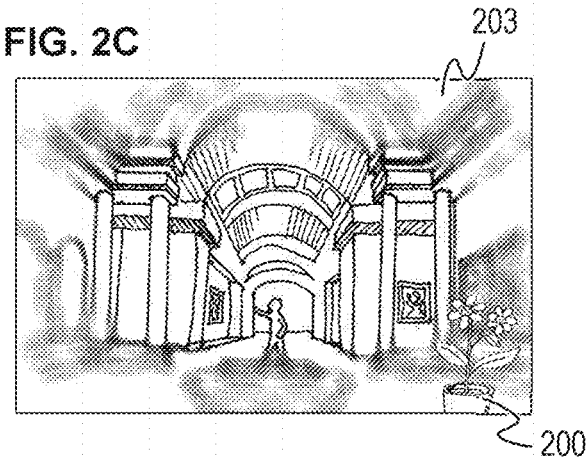

First, a composite image that may give the user a sense of discomfort will be explained. FIGS. 2A to 2C show a composite image in which a CG 200 (virtual object) is combined with a captured image serving as a background, the composite image being visually recognized by the user on an HMD.

FIG. 2A shows a composite image when there is almost no aberration in a captured image 201. In this case, even if the CG 200 to be combined is used as is for combining, it is possible to generate a composite image that does not particularly give the user a sense of discomfort. However, since an imaging device to be attached to an HMD is required to be small and lightweight, captured images often suffer from deterioration in image quality due to various optical factors.

For example, FIG. 2B shows a composite image when peripheral light attenuation has occurred in a captured image 202. Peripheral light attenuation refers to a phenomenon in which the brightness at the outer edge of an image is lower than at the center of the image due to the optical system of the imaging device. In this case, where the CG 200 is used as is for combining, a composite image that gives the user a great sense of discomfort will be generated.

Further, FIG. 2C shows an image obtained by combining the CG 200 with the captured image 203 when the captured image 203 has blur due to aberrations of the imaging optical system. In this case, since the resolution of the CG 200 is higher than that of the background captured image 203, a composite image that gives the user a strong sense of discomfort is generated.

Although the deterioration of the captured image due to these optical factors can be digitally corrected, complete elimination thereof is difficult. Therefore, where combining is performed using the CG 200 that also takes into account the image deterioration that is caused by optical factors and occurs in the captured image of the background, the resulting composite image often looks natural.

Embodiment 1

Figure 1A:
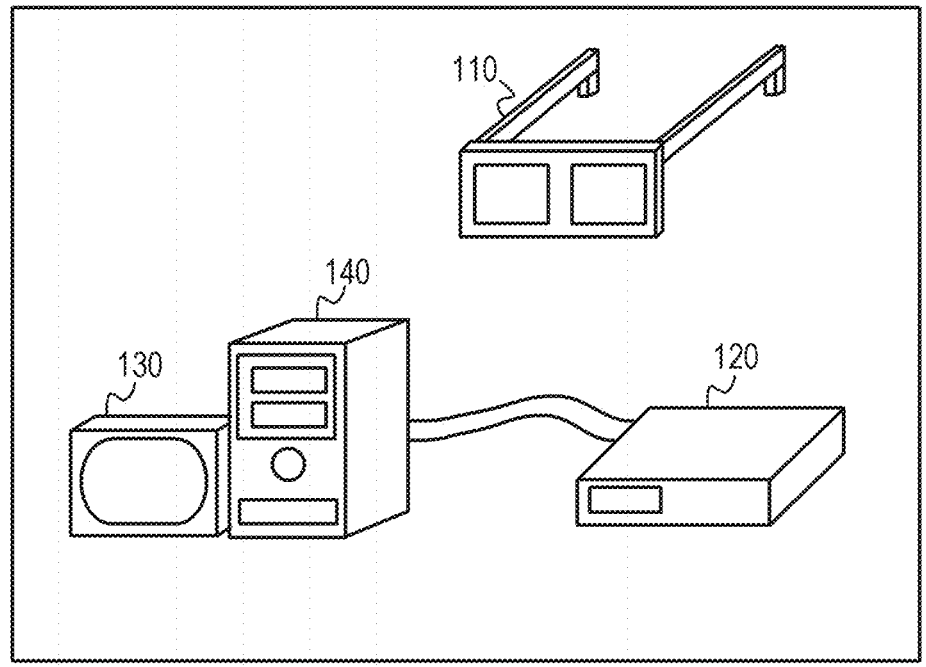
FIGS. 1A and 1B illustrate a configuration example of a system according to Embodiment 1.

An example of the configuration of the system according to Embodiment 1 will be described using the block diagram of FIG. 1A. The system according to Embodiment 1 includes an HMD 110, a controller 120, a display device 130, and an image processing device 140.

The HMD 110 is an example of a display device that can be mounted on the user's head. The controller 120 relays (controls) data communication between the image processing device 140 and the HMD 110. The display device 130 is for checking images processed by the image processing device 140. The image processing device 140 generates an image of a virtual object (CG) and a composite image (an image obtained by combining the image of the virtual object and the captured image).

Data communication between the HMD 110 and the controller 120 is performed via a small-scale network such as a WLAN (Wireless Local Area Network) or a WPAN (Wireless Personal Area Network). Data communication between the HMD 110 and the controller 120 is not limited to a specific form of communication, and can be realized by any form, regardless of whether it is wireless communication or wired communication. Further, the controller 120, which is configured separately from the image processing device 140 in FIG. 1A, may be incorporated into the image processing device 140 and integrated therewith.

Figure 1B:
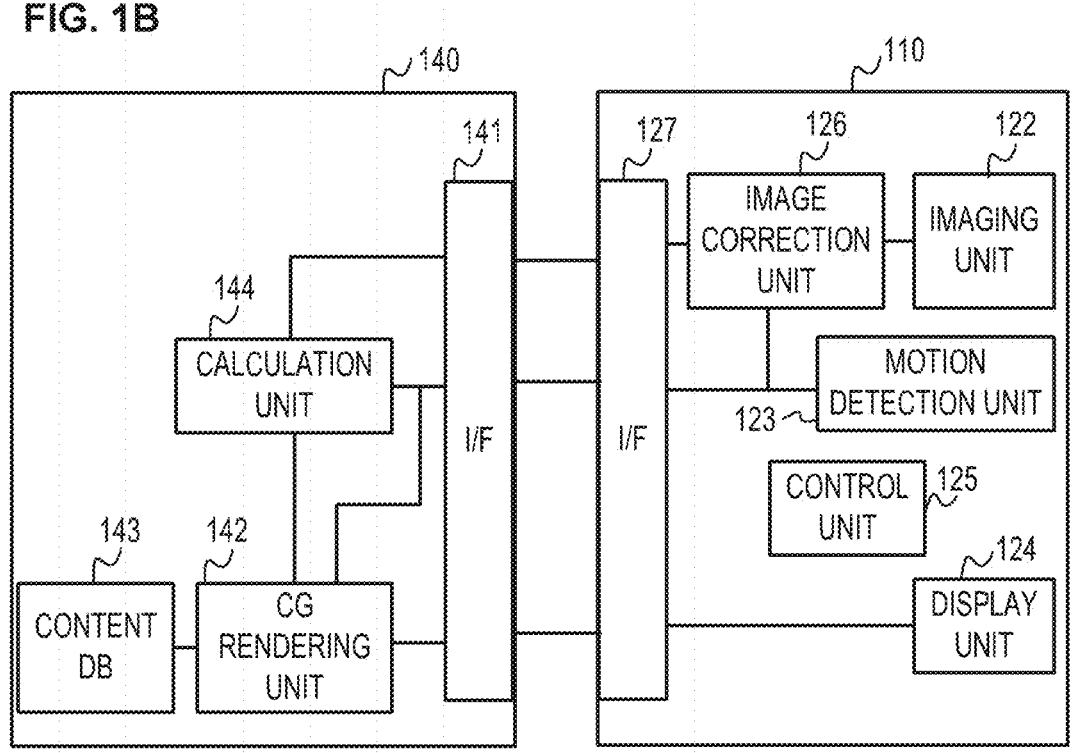

An example of the functional configuration of each of the image processing device 140 and the HMD 110 will be described using the block diagram in FIG. 1B. Actually, as described above, the image processing device 140 and the HMD 110 perform data communication via the controller 120, but the controller 120 is omitted in FIG. 1B.

First, the HMD 110 will be explained. The HMD 110 includes an imaging unit 122, a motion detection unit 123, a display unit 124, a control unit 125, an image correction unit 126, and an interface (I/F) 127.

The imaging unit 122 acquires a moving image in which a real space (a range that substantially matches the field of view of the user who wears the HMD 110 on his or her head) is captured. Since the position and orientation of the imaging unit 122 also change according to the movement of the HMD 110, the imaging unit 122 images a range corresponding to the movement of the HMD 110. The images of each frame (captured images) constituting the moving image are sequentially transmitted to the image correction unit 126. The imaging unit 122 includes an imaging optical system (one or more lenses). For this reason, the moving image (images of each frame making up the moving image) acquired by the imaging unit 122 suffers from image deterioration due to the characteristics of the imaging optical system.

The motion detection unit 123 is a sensor for detecting the motion direction and motion amount of the HMD 110. The motion detection unit 123 includes, for example, at least one of a gyro sensor and an acceleration sensor. The motion detection unit 123 outputs data indicating the detected motion direction and motion amount as motion vector data to the image processing device 140 via the I/F 127.

The display unit 124 is attached to the HMD 110 so as to be located in front of the user's eyes. The display unit 124 displays images or text received from the image processing device 140 via the I/F 127. As a result, the image or text received from the image processing device 140 is displayed in front of the user's eyes.

The control unit 125 controls the overall operation of the HMD 110.

The image correction unit 126 performs various correction processes on the captured image transmitted from the imaging unit 122. Here, the image correction unit 126 may correct as much as possible the influence of image deterioration (such as peripheral light attenuation or blurring) caused by the imaging unit 122. However, in the case of performing high-sensitivity imaging, the correction will have a large effect on the captured image in terms of noise deterioration, so in that case it is necessary to intentionally weaken the correction.

Next, the image processing device 140 will be explained. The image processing device 140 includes an interface (I/F) 141, a CG rendering unit 142, a content database (DB) 143, and a calculation unit 144.

The CG rendering unit 142 constructs a virtual object using data registered in the content DB 143. The CG rendering unit 142 generates an image of the virtual object seen from the imaging unit 122 in the position and orientation determined by the calculation unit 144 as a "virtual object image".

Here, the CG rendering unit 142 blurs the virtual object image based on, for example, various information received from the HMD 110 via the I/F 141. The CG rendering unit 142 then combines (superimposes) the virtual space image on the captured image received from the HMD 110 to generate a composite image (superimposed image). Then, the CG rendering unit 142 outputs the generated composite image. For example, the CG rendering unit 142 may output the composite image to the display device 130 or to the HMD 110 (display unit 124) via the I/F 141. Where the composite image is output to the HMD 110 (display unit 124), this composite image is presented in front of the user's eyes.

Data necessary for rendering virtual objects are registered in the content DB 143. For example, data specifying the shape of the virtual object, data specifying the color and texture of the virtual object, data related to the position in real space where the virtual object is arranged, texture map data, etc. are registered in the content DB 143.

The calculation unit 144 calculates the position and orientation of the imaging unit 122 (HMD 110). Various methods have been proposed in the past for calculating the position and orientation of the imaging unit 122, and any of these methods may be adopted. For example, the calculation unit 144 may calculate the position and orientation of the imaging unit 122 based on the motion vector data received from the HMD 110 and the captured image. Further, where the HMD 110 is equipped with a position and orientation sensor, the calculation unit 144 may calculate the position and orientation of the imaging unit 122 based on the measurement results obtained by the position and orientation sensor. Further, where a marker for which a position in real space has been ascertained in advance is arranged, the calculation unit 144 may calculate the position and orientation of the imaging unit 122 based on the coordinates of the marker in the captured image and the position of the marker in real space. Instead of markers, natural features in real space (such as the corners of a desk) may be used.

Internal Configuration of CG Rendering Unit

Figure 3:
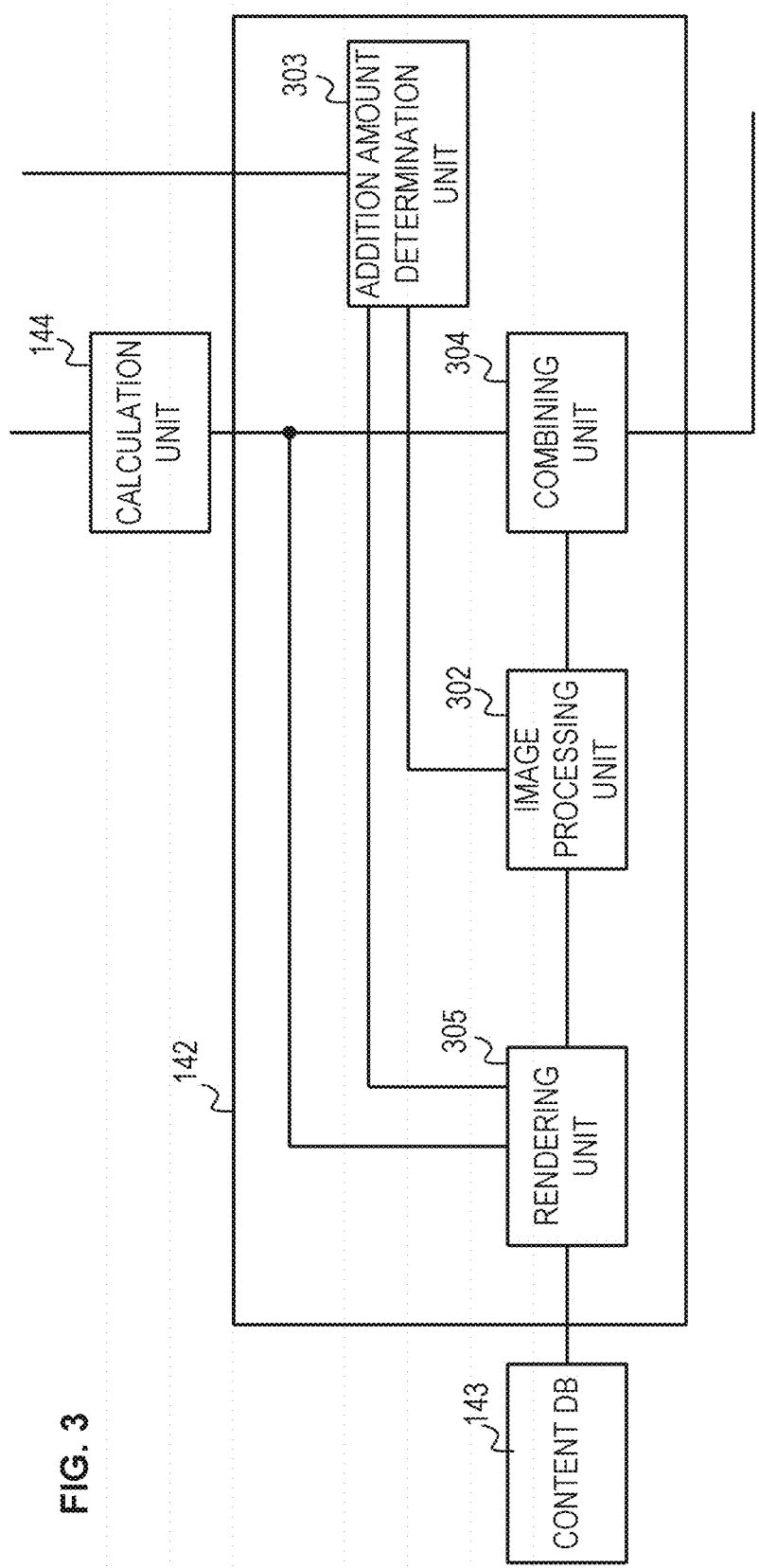
FIG. 3 illustrates the internal configuration of a CG rendering unit according to Embodiment 1.

An example of the internal configuration of the CG rendering unit 142 will be described with reference to FIG. 3. The CG rendering unit 142 includes an image processing unit 302, an addition amount determination unit 303, a combining unit 304, and a rendering unit 305.

The image processing unit 302 adds an optical deterioration amount such as the peripheral light attenuation amount or blur (blur due to aberration) to the virtual object image (virtual object) according to the combination position (the position where the virtual object image is arranged in the captured image). Specifically, where the image processing unit 302 has acquired from the addition amount determination unit 303 an instruction to add the optical deterioration amount to the virtual object image, the optical deterioration amount as correction information for correcting the virtual object image is added to the virtual object image. "The optical deterioration amount is added to the virtual object image" means, for example, "performing correction such as adding the optical deterioration amount (pixel value indicated by the optical deterioration amount) to the pixel value of the virtual object image".

Meanwhile, where the image processing unit 302 acquires from the addition amount determination unit 303 an instruction not to add the optical deterioration amount, the virtual object image generated by the rendering unit 305 is output as it is to the combining unit 304. At this time, image processing other than the optical deterioration amount addition may be performed.

The addition amount determination unit 303 determines whether to add the optical deterioration amount to the virtual object image. Furthermore, when adding the optical deterioration amount to the virtual object image, the addition amount determination unit 303 determines the optical deterioration amount to be added to the virtual object image.

The combining unit 304 generates a composite image by combining the captured image received from the HMD 110 with the virtual object image acquired from the image processing unit 302. The combining unit 304 outputs the generated composite image to the HMD 110 (display unit 124) via the I/F 141. Thereby, the combining unit 304 controls the HMD 110 to display the composite image (performs display control).

The rendering unit 305 constructs a virtual object based on the data registered in the content DB 143 and arranges the virtual object in the virtual space. The rendering unit 305 generates an image of the virtual object viewed from the imaging unit 122 at the position and orientation calculated by the calculation unit 144 as a "virtual object image". Since the technique of generating an image of a virtual object seen from an object in a prescribed position and orientation is well known, a description of this technique will be omitted. Furthermore, the rendering unit 305 determines the distance between the imaging unit 122 and the virtual object (the distance in the three-dimensional space represented by the composite image) based on the position of the imaging unit 122 determined by the calculation unit 144 and the data of the position where the virtual object is arranged.

Generation Process

The process of generating a composite image (generation process) will be described with reference to the flowchart in FIG. 4. The processing in the flowchart of FIG. 4 is realized by controlling each component of the image processing device 140 by a control unit (such as a CPU) that is not shown. It is assumed that before the processing in the flowchart of FIG. 4 is started, the generation of the virtual object image by the rendering unit 305 and the calculation of the combining position (the position at which the virtual object image is combined in the captured image) of the virtual object image by the calculation unit 144 and the like have been completed. The combining position of the virtual object image is a position corresponding to the range imaged by the imaging unit 122 in the composite image. This is because the combining position is fixed at a specific position in real space.

In step S401, the addition amount determination unit 303 determines the optical deterioration amount (optical deterioration information) to be added to each pixel of the virtual object image. Details of this process will be described hereinbelow using the flowchart of FIG. 5.

In step S402, the image processing unit 302 adds the optical deterioration amount (optical deterioration information) calculated in step S401 to the virtual object image. That is, the image processing unit 302 corrects (adjusts) the optical deterioration of the virtual object image so as to match the optical deterioration of the captured image. Here, since gamma may be applied to each virtual object image, it is necessary to correct the optical deterioration amount, which has been calculated in step S401, based on the gamma.

In step S403, the combining unit 304 combines the virtual object image to which the optical deterioration amount has been added with the captured image. As a result, even if the user moves his or her head suddenly, a virtual object image that gives the user less sense of discomfort can be used for combining.

The process of determining the optical deterioration amount in step S401 will be described below. Explained hereinbelow is the case where the peripheral light attenuation amount is used as the optical deterioration amount. In this case, the peripheral light attenuation amount corresponding to a state of light quantity reduction due to the characteristics of the imaging optical system at the combination position (the position where the virtual object image is combined in the captured image) is added.

In general, the relationship between the quantity of light related to peripheral light attenuation in a captured image is defined according to the cosine fourth power law (COS fourth power law) as shown in formula (1) below.

[Math 1]

$$I = I_0 \cos^4 \theta \quad (1)$$

In formula (1), "I" indicates the quantity of light (illuminance) after incidence on the imaging optical system, and "$I_0$" indicates the quantity of light before incidence. Therefore, the peripheral light attenuation amount is the result of subtracting the quantity I of light after incidence from the quantity $I_0$ of light before incidence. Furthermore, as shown in FIG. 7, θ indicates the angle between the incident light and the optical axis and can generally be defined as in the following formula (2).

[Math 2]

$$\theta = \tan^{-1}(h/f) \quad (2)$$

Figure 7:
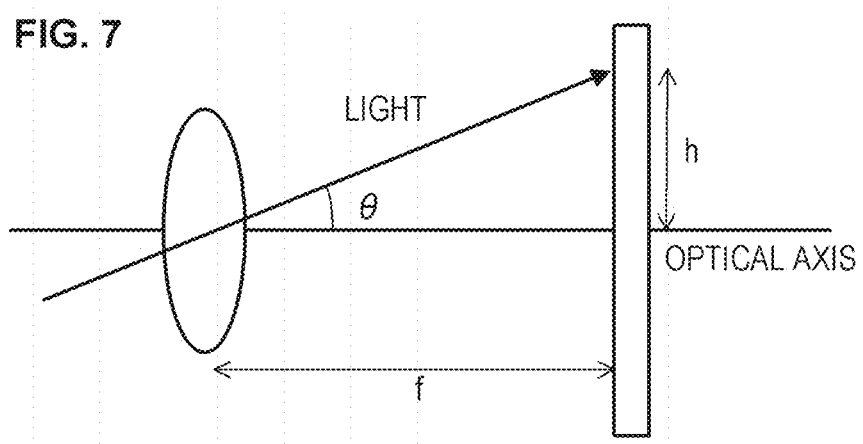
FIG. 7 illustrates calculation of the peripheral light attenuation amount according to Embodiment 1.

Here, in formula (2), as shown in FIG. 7, h indicates the distance from the optical axis on the imaging plane (image height), and f indicates the focal length of the imaging optical system. Further, since θ changes depending on the aperture of the imaging optical system, the quantity I of light changes depending on the focal length, aperture, and image height.

Figure 9:
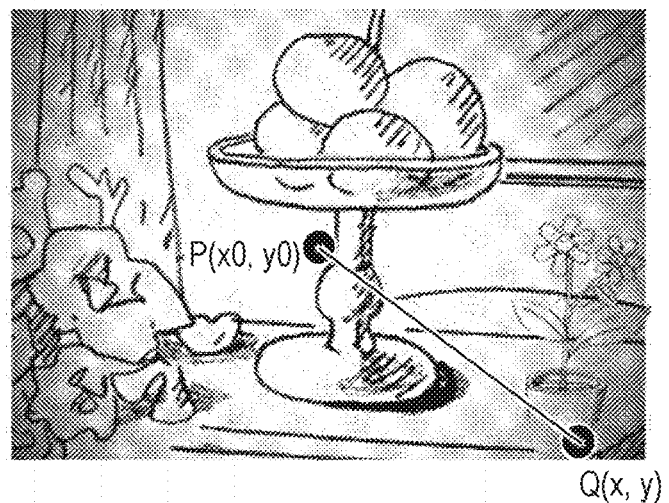
FIG. 9 illustrates calculation of the peripheral light attenuation amount according to Embodiment 1.

FIG. 9 is a diagram illustrating an example of calculating the peripheral light attenuation amount. Point P in FIG. 9 indicates the optical axis center position of the imaging optical system. For example, to combine a virtual object image at the position of point Q, the peripheral light attenuation amount at point Q is calculated by taking into account the distance between P and Q (that is, a square root of $(x0-x)^2+(y0-y)^2$). Such calculation is normally performed for all the pixels of the CG image of the virtual object. However, since the peripheral light attenuation amount changes depending on the focal length, aperture, and image height, when such calculations are performed for all pixels, the calculation load is large.

Further, some of the captured images are processed to correct the influence of peripheral light attenuation. In this case, it is necessary to determine the peripheral light attenuation amount to be added to each pixel of the virtual object by also taking into account the correction information thereof.

Here, in the correction applied to the captured image, since the correction is accompanied by aggravation of noise, it is often impossible to completely correct the influence of peripheral light attenuation of the imaging optical system. For this reason, where a calculation is performed to correct the virtual object image by also taking into consideration the fact that the influence of the peripheral light attenuation in the captured image cannot be completely corrected, the calculation will take more time, and the calculation of the peripheral light attenuation amount (correction value) for correcting the virtual object image will take more time as well. Where it takes a long time to calculate the peripheral light attenuation amount, a virtual object to which an inappropriate peripheral light attenuation amount is added will be displayed until the calculation of the peripheral light attenuation amount is completed. Furthermore, when the calculation of the peripheral light attenuation amount is completed, the virtual object is adjusted to the desired brightness, but since the brightness of the virtual object changes while the brightness of the captured image remains unchanged at this time, the user will notice flickering.

Optical Deterioration Amount Determination Process; S401

Therefore, in step S401, where the peripheral light attenuation amount to be added changes significantly, the addition amount determination unit 303 quickly changes the peripheral light attenuation amount to be added, and then improves the accuracy of the peripheral light attenuation amount to be added, thereby reducing the sense of discomfort given to the user. The details of such a method for calculating the peripheral light attenuation amount will be explained using the flowchart of FIG. 5. This processing is particularly aimed at reducing the sense of discomfort given to the user when the user shakes his or her head and the combination position changes rapidly.

In step S501, the addition amount determination unit 303 determines whether it is necessary to add a peripheral light attenuation amount to the virtual object image. For example, where the peripheral light attenuation amount of a pixel of the captured image corresponding to the center of gravity position of the virtual object image (the peripheral light attenuation amount after correction in the case where the influence of the peripheral light attenuation has been corrected on the captured image) is less than a predetermined threshold that has been set in advance, it is not necessary to add the peripheral light attenuation amount to the virtual object image. Where it is determined that it is necessary to add the peripheral light attenuation amount to the virtual object image, the processing advances to step S502. Where it is determined that it is not necessary to add the peripheral light attenuation amount to the virtual object image, the processing of this flowchart ends.

In step S502, the addition amount determination unit 303 determines whether the motion amount of the HMD 110 (the amount of rotation or movement of the HMD 110) in one frame between the current frame and the previous frame is smaller than a threshold. Where it is determined that the motion amount of the HMD 110 is smaller than the threshold, the processing advances to step S505. Where it is determined that the motion amount of the HMD 110 is greater than or equal to the threshold, the processing advances to step S503.

Further, since the motion amount of the HMD 110 and the change in the combination position are mutually related, the addition amount determination unit 303 may determine whether the difference between the combination position of the current frame and the combination position of the previous frame is smaller than a threshold value. In this case, where it is determined that the difference between the two combination positions is smaller than the threshold value, the processing advances to step S505. Where it is determined that the difference between the two combination positions is greater than or equal to the threshold, the processing advances to step S503.

Here, the threshold in step S502 may be changed according to the characteristics of the imaging optical system. For example, where the difference in the peripheral light attenuation amount between the center of the captured image and the outer edge (periphery) of the captured image is smaller than a predetermined value, the threshold may be large because the sense of discomfort is unlikely to be given to the user even if the motion amount of the HMD 110 is large and peripheral light attenuation amount of the current frame is used in the next frame.

In step S503, the addition amount determination unit 303 calculates (acquires) the peripheral light attenuation amount to be added to each pixel of the virtual object image of the next frame by using a simple method (processing with a smaller amount of calculation than the processing in step S506). Specifically, the addition amount determination unit 303 selects one representative pixel (pixel at the center position or center of gravity position etc.) of the virtual object image and calculates the peripheral light attenuation amount occurring at the pixel (position) of the captured image corresponding to the position of the selected pixel. Then, the addition amount determination unit 303 determines the calculated peripheral light attenuation amount as the peripheral light attenuation amount to be added to all the pixels of the virtual object image. In step S503, any method may be used as long as the peripheral light attenuation amount to be added to each pixel of the virtual object image of the next frame can be calculated (acquired) by a process that requires less calculation than the process of calculating the peripheral light attenuation amount of all the pixels in the range corresponding to the virtual object image within the captured image. For example, the addition amount determination unit 303 selects four representative pixels (for example, upper right, upper left, lower right, and lower left pixels) of the virtual object image and calculates the peripheral light attenuation amount occurring at four pixels (positions) of the captured image corresponding to the positions of those pixels. Then, the addition amount determination unit 303 may determine the average value of the calculated peripheral light attenuation amounts of the four pixels as the peripheral light attenuation amount to be added to all the pixels of the virtual object image.

In step S504, the addition amount determination unit 303 attaches a flag indicating that a target has been achieved (target achievement flag) to the next frame.

In step S505, the addition amount determination unit 303 determines whether the current frame is a calculation frame (the frame to be processed in step S506). One frame out of several consecutive frames is set in advance as a calculation frame. Further, a frame to which a target achievement flag has been attached also corresponds to a calculation frame. Where it is determined that the current frame is a calculation frame, the processing advances to step S506. Where it is determined that the current frame is not a calculation frame, the processing advances to step S507. The processing may advance to step S506 without performing the processing of step S505. In other words, the processing of step S506 may be performed regardless of the type of the current frame.

In step S506, the addition amount determination unit 303 calculates the peripheral light attenuation amount occurring in each of a plurality of pixels of the captured image corresponding to the virtual object image (a plurality of pixels of the captured image corresponding to the respective positions of all the pixels of the virtual object image) according to formula (1). The addition amount determination unit 303 sets the calculated peripheral light attenuation amount of each pixel as "target correction information" which is the ideal peripheral light attenuation amount to be added to each pixel of the virtual object image.

The processing of step S506 does not need to be performed in real time. Accurate peripheral light attenuation amounts may be calculated for all of the plurality of pixels corresponding to the virtual object image in the captured image over a long period of time. Then, simultaneously with the start of the processing of step S506, the processing of step S507 may be started.

As described above, the processing performed in step S506 places a high calculation load on the image processing device 140. Therefore, where there is little need for recalculation (that is, the HMD 110 has not moved significantly or the combination position has not changed significantly), the processing of step S506 is executed once every several frames.

In step S507, the addition amount determination unit 303 calculates the peripheral light attenuation amount to be added to each pixel of the virtual object image of the next frame on the basis of the peripheral light attenuation amount added to each pixel of the virtual object image of the current frame (current) (hereinafter referred to as "current correction information") and the target correction information.

Specifically, where the target correction information and the current correction information are different, the addition amount determination unit 303 calculates the peripheral light attenuation amount to be added to each pixel of the virtual object image of the next frame by correcting the current correction information to approach the target correction information. For example, where the target correction information and the current correction information are different, the addition amount determination unit 303 calculates the correction information included between the target correction information and the current correction information (the average of the target correction information and the current correction information or the like) as the peripheral light attenuation amount to be added to the virtual object image. For example, where the processing of step S503 has been performed (where the motion amount of the HMD 110 has changed from that larger than the threshold to that smaller than the threshold), a peripheral light attenuation amount different from the target correction information is calculated.

Therefore, a peripheral light attenuation amount that approaches the target correction information is calculated. The peripheral light attenuation amount may reach the target correction information in the next frame, but where the peripheral light attenuation amount changes suddenly and greatly, flickering will be visually recognized by the user. For this reason, the amount by which the peripheral light attenuation amount is changed at one time may be limited to gradually bring it closer to the target correction information.

Meanwhile, where the target correction information and the current correction information match (are the same), the addition amount determination unit 303 determines to use the target correction information for the peripheral light attenuation amount to be added to the virtual object image (each pixel of the virtual object image) of the next frame.

Necessity of Changing Optical Deterioration Amount

Where the combination position (position on the captured image) at which the virtual object image is combined suddenly changes, such as when the user moves his or her head, the composite image will become unnatural unless the optical deterioration amount to be added is also changed according to the movement. Accordingly, the necessity of changing the optical deterioration amount will be explained using FIGS. 6A to 6C.

Figure 6A:
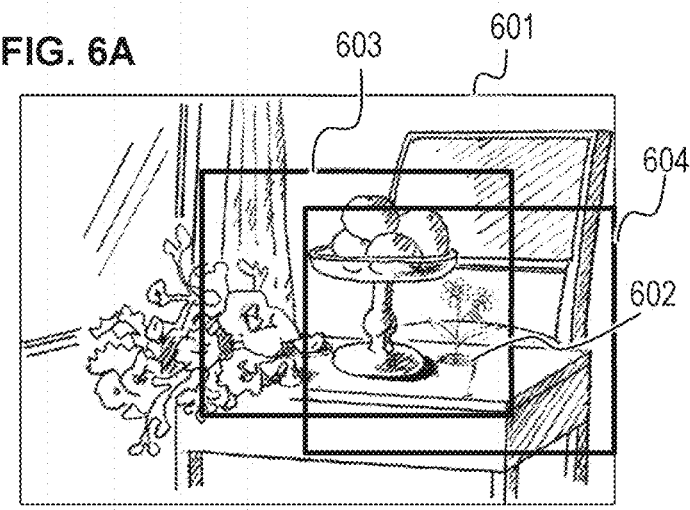
FIGS. 6A to 6C illustrate the necessity of changing the peripheral light attenuation amount according to Embodiment 1.

FIG. 6A shows an environment 601 in which a user is present. An area 603 and an area 604 are areas that the user views through the HMD 110. Specifically, a case will be described in which, after the area 603 is displayed on the HMD 110, the user shakes his or her head and the area 604 is displayed on the HMD 110.

Figure 6B:
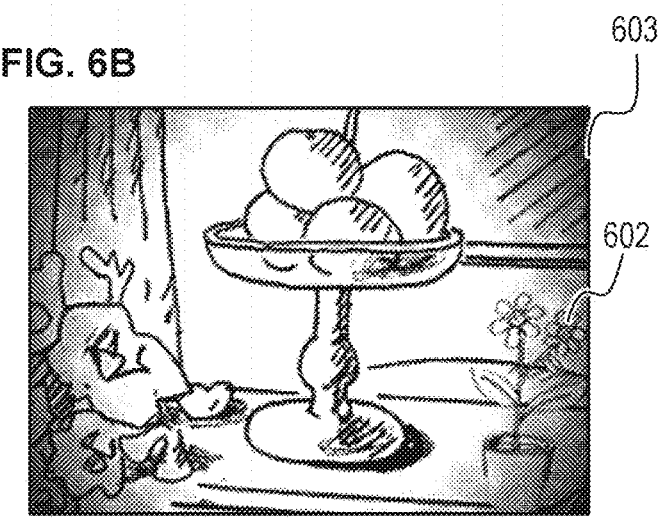

FIG. 6B shows how the area 603 is displayed on the HMD 110. At this point in time, the peripheral light attenuation amount same as the peripheral light attenuation amount (optical deterioration amount) that occurs in the captured image is added to a flower 602, which is the virtual object image. Therefore, the virtual object image can be visually recognized as a natural image that blends in with the background.

Figure 6C:
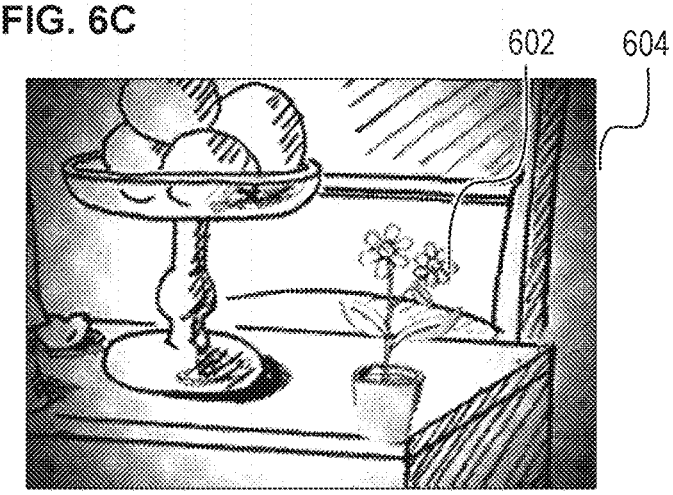

Meanwhile, FIG. 6C shows an image (area 604) that is displayed when the user turns his or her head to the right in the state shown in FIG. 6B. At this time, although the calculation process of the peripheral light attenuation amount that has occurred in the captured image has not been completed and the flower 602 is located near the center of the captured image, the peripheral light attenuation amount applied in the state shown in FIG. 6B remains added to the flower 602. As a result, a brightness mismatch between the background and the virtual object occurs.

Furthermore, after that, the brightness of the virtual object image is adjusted to an appropriate brightness by completing the calculation process of the peripheral light attenuation amount that has occurred in the captured image. However, during this adjustment, the brightness of only the flower 602 changes. For this reason, the user feels flickering (sense of discomfort). Thus, where the combination position of the virtual object image changes significantly, it is necessary to change, as quickly as possible, the peripheral light attenuation amount to be added to the virtual object image to enable blending with the surroundings.

Necessity of Processing of Step S503

The calculation of the peripheral light attenuation amount as the optical deterioration amount in step S503 by a simple method (method with a small amount of calculation) will be described using FIGS. 8A to 8C. Where the user moves his or her head as described using FIGS. 6A to 6C, a sense of discomfort is given to the user unless the optical deterioration amount added to the virtual object image is quickly changed. Meanwhile, where the resolution of the virtual object image is high (the number of pixels is large), calculating the optical deterioration amount with high accuracy for all the pixels requires a large calculation load. For this reason, it is difficult to quickly calculate an optical deterioration amount with high accuracy (high-accuracy deterioration amount). Therefore, even if an optical deterioration amount with low accuracy (low-accuracy deterioration amount) is used, it is necessary to minimize flicker by quickly updating the optical deterioration amount to be added.

For example, where it takes time to calculate the high-accuracy deterioration amount, uniformly adding the optical deterioration amount, which should be added to the representative position of the virtual object image of the current frame, to each pixel is preferable over displaying a virtual object image to which the optical deterioration amount of the previous frame has been added. The representative position is, for example, the center of gravity position or the upper left position of the virtual object image.

Figure 8A:
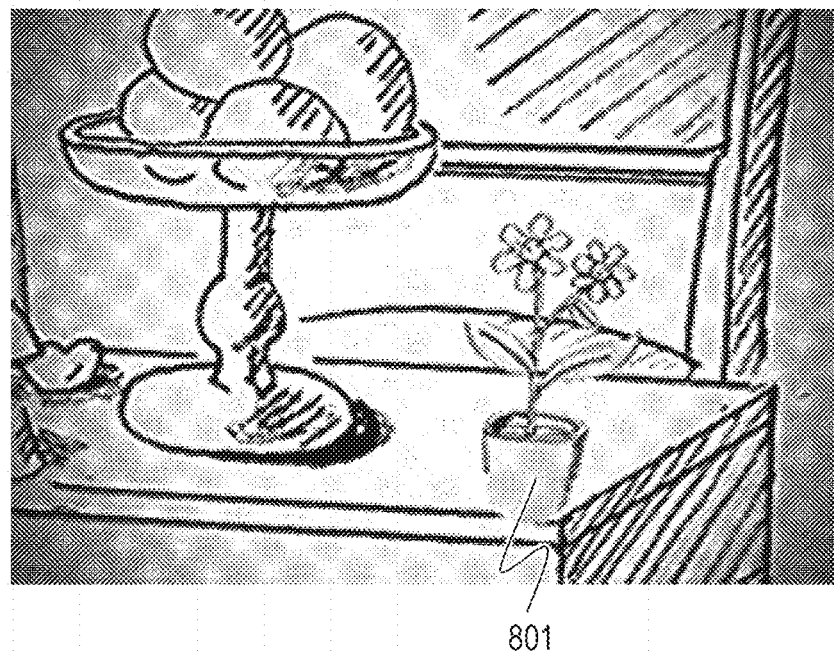
FIGS. 8A and 8B illustrate simple calculation of the peripheral light attenuation amount in Embodiment 1.
Figure 8B:
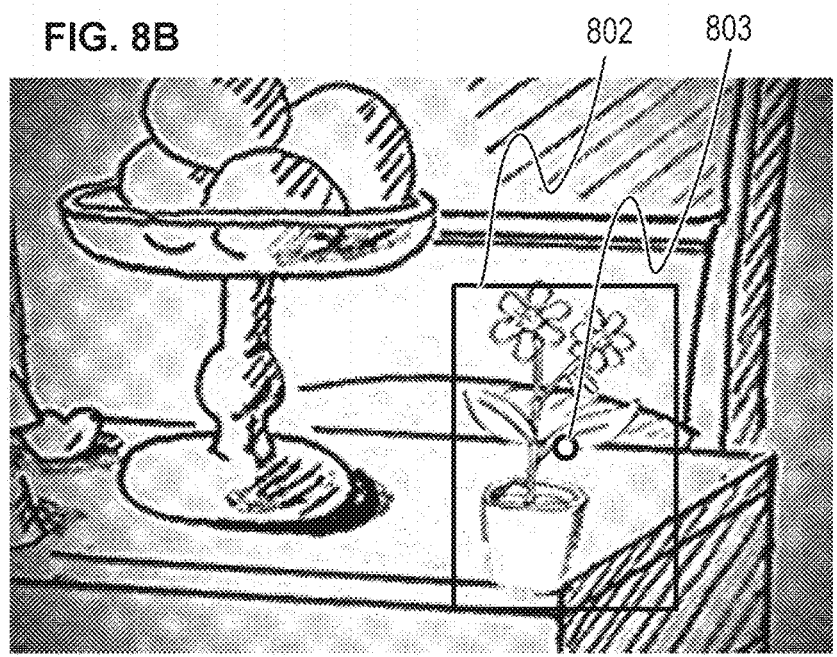

For example, FIG. 8A shows a composite image (image corresponding to FIG. 6C) in the case where the optical deterioration amount added in the previous frame has been added to each pixel of the virtual object in the current frame as well (where the addition of the high-accuracy deterioration amount is not completed). Meanwhile, FIG. 8B shows a composite image in the case where the optical deterioration amount, which should be added to the pixel at the center of gravity position 803 of the virtual object image, is uniformly added to all the pixels of the virtual object image.

Since the virtual object image 802 in FIG. 8A takes into account the peripheral light attenuation characteristics of the previous frame, the virtual object image 802 appears dark, giving a great sense of discomfort to the user viewing the composite image. Meanwhile, the virtual object image 802 in FIG. 8B is corrected to have a brightness that takes into account the brightness of the captured image near the center of gravity position 803 of the virtual object image 802, although the highly accurate optical deterioration amount is not taken into account. Therefore, the composite image shown in FIG. 8B gives the user less sense of discomfort than the composite image shown in FIG. 8A. Where all the pixels are corrected with a uniform optical deterioration amount, the optical deterioration amount may be calculated for one pixel only, so the calculation load (amount of calculation) can be significantly reduced. Therefore, the optical deterioration amount can be applied in real time without delay.

As described above, according to Embodiment 1, where a virtual object (virtual object image) is combined with a captured image, it is possible to quickly change (adjust) the optical deterioration amount (peripheral light attenuation amount) to be added to the virtual object. Therefore, it is possible to reduce the sense of discomfort when the user visually recognizes the image.

In Embodiment 1, the explanation was given using the HMD 110 as an example, but a device (such as a smartphone) equipped with an imaging device may be used instead of the HMD 110.

Embodiment 2

Next, Embodiment 2 will be described. Hereinafter, in Embodiment 2, description of the same contents as in Embodiment 1 will be omitted. In Embodiment 2, an example will be described in which a deterioration component related to blur caused by an imaging optical system (such as spherical aberration) is taken into account in the virtual object image.

Due to the influence of aberrations occurring in the imaging optical system, the light generated from one point on the subject does not converge to one point but spreads out slightly. A distribution having such a slight spread is expressed by a point spread function (PSF). Since the captured image is formed by applying PSF to the subject image, the resolution of the captured image deteriorates (the captured image becomes blurred) due to the influence of the imaging optical system.

In other words, in the captured image, blur corresponding to the PSF occurs, but this blur does not occur in the virtual object image. Therefore, in order to make the composite image look natural, it is preferable to add blur corresponding to the combination position (blur as correction information) to the virtual object image. This makes it possible to provide a composite image (video) that gives the user less sense of discomfort.

Figure 10A:
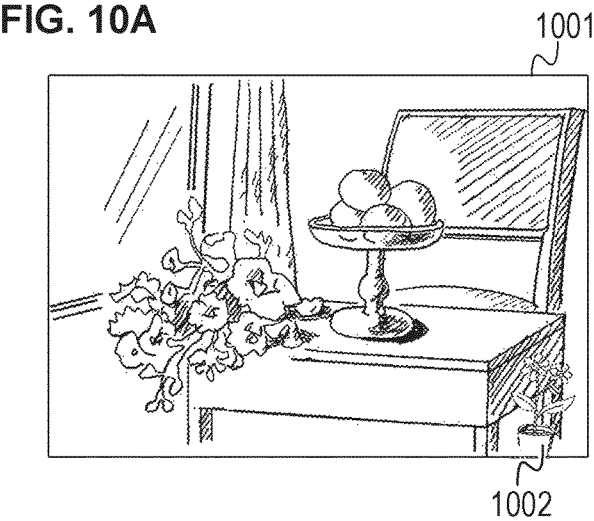
FIGS. 10A to 10C illustrate a composite image according to Embodiment 1.
Figure 10B:
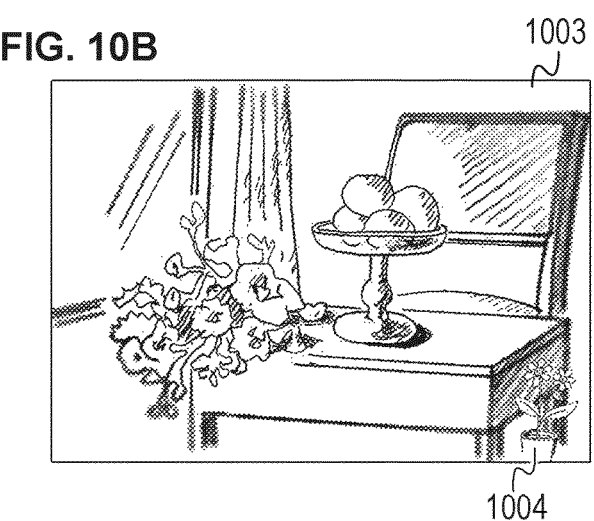
Figure 10C:
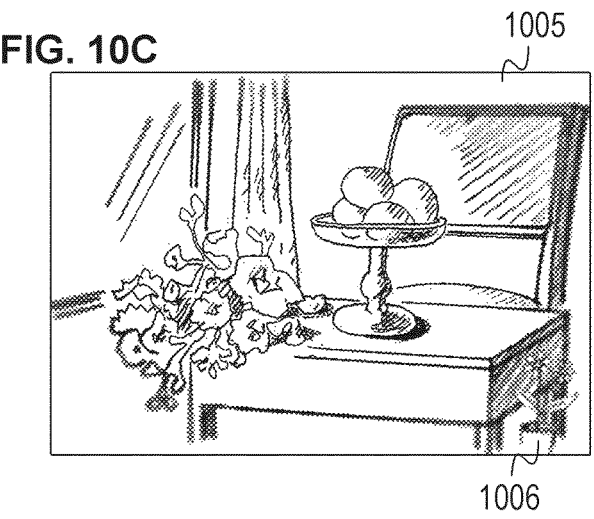

FIGS. 10A to 10C represent a composite image that is visually recognized by a user when a virtual object image is combined with a captured image. A captured image 1001 in FIG. 10A is in a state where the imaging optical system has no aberrations that affect blur. In this case, the virtual object image 1002 is used for combining as it is without any particular processing.

Meanwhile, in the case in which the imaging optical system has aberrations that affect blur (the captured image 1003 has blur) as shown in FIG. 10B, where the virtual object image 1004 is used as is for combining, the composite image will generate a sense of discomfort. Here, in the captured image 1003, the blur increases as the outer edge is approached. However, since the distribution tendency of blur depends on the imaging optical system, there are cases where the position closer to the center of the image becomes blurred.

FIG. 10C shows a composite image in the case of combining by adding a blur that matches the combination position to the virtual object image 1004. As a result, the composite image shown in FIG. 10C can be visually recognized as a composite image including a virtual object that blends into the background more than in the composite image shown in FIG. 10B.

In Embodiment 2, the process of adding blur, which is the optical deterioration amount, to the virtual object image (blurring process) can be realized in the same way as the process of the flowchart shown in FIG. 4. Specifically, the image processing device 140 calculates blur (the amount of blur to be added) as the optical deterioration amount in step S401, adds the blur to the virtual object image in step S402, and then performs combining in step S403. With this, the image processing device 140 realizes the generation of the composite image shown in FIG. 10C.

At this time, a method for calculating the blur to be added (step S401) can include preparing in advance a plurality of filters that define blur and selecting a filter to be applied to the virtual object image from among these filters.

Figures 12A, 12B, 12C, 12D:
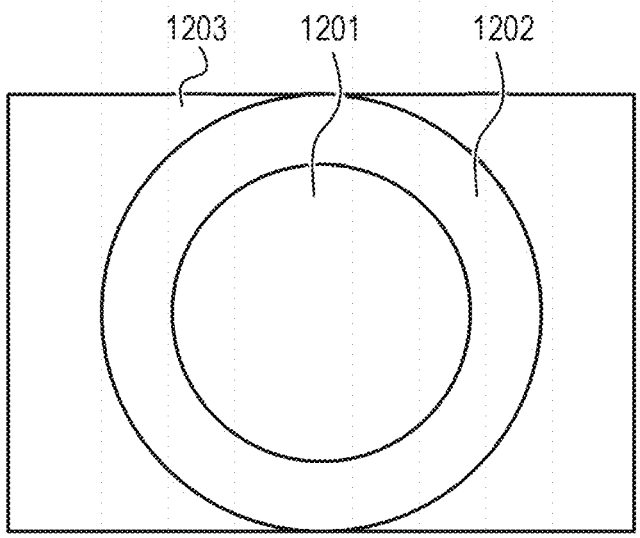
FIGS. 12A to 12D illustrate filters according to Embodiment 2.

FIG. 12A shows the area of the captured image. Here, the area of the captured image is divided into three areas, areas 1201 to 1203, in accordance with the characteristics of the imaging optical system (characteristics related to blur). Since characteristics related to blur also change according to the image height (image height direction) centered on the optical axis, the areas are divided according to the image height.

A filter realizing a blur that approximates the blur occurring in each area is designed in advance. For example, since an area 1201 is near the center of the optical axis, as shown in FIG. 12B, this area does not need to be blurred. Therefore, a reference filter is set to "None" for the area 1201. Since an area 1202 is an area where some blurring begins to occur due to aberrations, a filter A that adds blurring is set for the area 1202. For example, the filter A is a 3×3 Gaussian filter as shown in FIG. 12C. Further, since an area 1203 has a high image height and a large amount of aberration, a filter B that adds stronger blurring (shading) is set for the area 1203. For example, the filter B is a 5×5 Gaussian filter as shown in FIG. 12D.

The filters and area division method described above are just examples, and other methods can be used as the area division method and blurring method. For example, the process of adding blur may be performed by a recovery processing using an inverse function of the PSF of the actual optical system.

Here, details of the processing of step S401 according to Embodiment 2 (the processing of determining the blur to be added to the virtual object image on the basis of information on the blur of the captured image at the combination position) will be described with reference to FIG. 11.

In step S1101, the addition amount determination unit 303 determines whether it is necessary to add blur to the virtual object image. For example, where the positions of all the pixels in the current frame of the virtual object image are included in the area 1201 in FIG. 12A, the addition amount determination unit 303 determines that there is no need to add blur to the virtual object image. In other cases, the addition amount determination unit 303 determines that it is necessary to add blur to the virtual object image. Where it is determined that it is necessary to add blur to the virtual object image, the processing advances to step S1102. Where it is determined that it is not necessary to add blur to the virtual object image, the processing of this flowchart ends.

In step S1102, similarly to step S502, the addition amount determination unit 303 determines whether the motion amount of the HMD 110 in one frame between the current frame and the previous frame is smaller than a threshold. Where it is determined that the motion amount of the HMD 110 is smaller than the threshold, the processing advances to step S1105. Where it is determined that the motion amount of the HMD 110 is greater than or equal to the threshold, the processing advances to step S1103.

In step S1103, the addition amount determination unit 303 determines a filter to be applied to each pixel of the virtual object image of the next frame by using a simple method (processing with a smaller amount of calculation than the processing in step S1106). Where the filter is changed for each pixel of the virtual object image, the processing becomes complicated and immediate reflection of the filter becomes difficult. Therefore, the addition amount determination unit 303 determines the filter (blur) to be applied to the image height corresponding to the center of gravity position of the virtual object image as the filter (blur) to be applied to all the pixels of the virtual object image.

In step S1104, similarly to step S504, the addition amount determination unit 303 attaches a flag indicating that a target has been achieved (target achievement flag) to the next frame.

In step S1105, similarly to step S505, the addition amount determination unit 303 determines whether the current frame is a calculation frame (the frame to be processed in step S1106). Where it is determined that the current frame is a calculation frame, the processing advances to step S1106. Where it is determined that the current frame is not a calculation frame, the processing advances to step S1107.

In step S1106, the addition amount determination unit 303 sets target correction information. In the present embodiment, the addition amount determination unit 303 determines into which of the areas 1201 to 1203, such as shown in FIG. 12A, each of all the pixels of the virtual object image is included, and determines a filter (blur) to be applied to each pixel. Then, the addition amount determination unit 303 sets a filter (filter coefficient) to be applied to each pixel as target correction information.

In step S1107, the addition amount determination unit 303 determines a filter to be applied to each pixel of the virtual object image of the next frame. First, the addition amount determination unit 303 determines whether the filter (current correction information) applied to each pixel of the virtual object image of the current frame matches the target correction information. Where it is determined that the two types of correction information (filters) do not match, the addition amount determination unit 303 determines to use the target correction information as a filter to be applied to each pixel of the virtual object image of the next frame. Here, where there is a possibility that flickering may occur as a result of applying the target correction information to the virtual object image, the addition amount determination unit 303 may determine to prepare correction information (filter) intermediate between the target correction information and the current correction information and to apply the intermediate correction information (filter) to the virtual object image.

According to Embodiment 2, even when the HMD moves sharply, it is possible to generate a composite image that includes a virtual object with little flickering and a high degree of fusion with the captured image.

According to the present invention, it is possible to reduce the sense of discomfort when a user visually recognizes an image obtained by combining a virtual object with a captured image.

While the present invention has been described above in detail based on preferred embodiments thereof, the present invention is not limited to these specific embodiments, and the present invention may also include various forms without departing from the gist of the present invention. Some of the embodiments described above may be combined as appropriate.

In addition, in the above, "where A is greater than or equal to B, the processing advances to step S1, and where A is smaller (lower) than B, the processing advances to step S2" may be read as "where A is greater (higher) than B, the processing advances to step S1, and where A is smaller than or equal to B, the processing advances to step S2". Conversely, "where A is greater (higher) than B, the processing advances to step S1, and where A is smaller than or equal to B, the processing advances to step S2" may be read as "where A is greater than or equal to B, the processing advances to step S1, and where A is smaller (lower) than B, the processing advances to step S2". Therefore, unless a contradiction arises, "greater than or equal to A" may be read as "greater (higher; longer; more) than A", and "smaller than or equal to A" may be read as "smaller (lower; shorter; less) than A". "Greater (higher; longer; more) than A" may be read as "greater than or equal to A" and "smaller (lower; shorter; less) than A" may be read as "smaller than or equal to A".

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-198374, filed on Dec. 13, 2022, which is hereby incorporated by reference herein in its entirety.

What is claimed is:

1. An image processing device comprising at least one memory and at least one processor which function as:
   a display control unit configured to control a display device to display a composite image obtained by combining an image of a virtual object with a captured image captured by an imaging device;
   an acquisition unit configured to acquire a combination position for combining the image of the virtual object in the captured image;
   an image processing unit configured to perform image processing on the image of the virtual object, the image processing being based on information on image deterioration of the captured image at the combination position; and
   a control unit configured to control the image processing according to a motion amount of the display device, wherein
   in a case where the motion amount of the display device is smaller than a threshold, the control unit controls the image processing unit to acquire the information on image deterioration of the captured image at the combination position with a first amount of calculation, and
   in a case where the motion amount of the display device is larger than the threshold, the control unit controls the image processing unit to acquire the information on image deterioration of the captured image at the combination position with a second amount of calculation that is smaller than the first amount of calculation.

2. The image processing device according to claim 1, wherein
   the imaging device images a range corresponding to a movement of the display device, and
   the combination position is a position corresponding to the range imaged by the imaging device.

3. The image processing device according to claim 1, wherein
   the information on image deterioration is information resulting from characteristics of an optical system of the imaging device.

4. The image processing device according to claim 3, wherein
   the information on image deterioration is peripheral light attenuation information.

5. The image processing device according to claim 3, wherein
   the information on image deterioration is blur information.

6. The image processing device according to claim 1, wherein
   in a case where the motion amount of the display device is larger than the threshold, the information on image deterioration of the captured image at the combination position is information on image deterioration at a position of the captured image corresponding to a specific position of the image of the virtual object.

7. The image processing device according to claim 1, wherein
   in a case where the motion amount of the display device is smaller than the threshold, the information on image deterioration of the captured image at the combination position is information on image deterioration at each position of a first range of the captured image, and
   the first range is a range corresponding to pixels of the image of the virtual object.

8. The image processing device according to claim 1, wherein
   in a case where the motion amount of the display device has changed from a state where the motion amount is smaller than the threshold to a state where the motion amount is larger than the threshold, the control unit controls the image processing unit to acquire first correction information corresponding to the information on image deterioration acquired with the first amount of calculation and perform the image processing on the image of the virtual object on a basis of the first correction information, and
   in a case where the motion amount of the display device has changed from a state where the motion amount is larger than the threshold to a state where the motion amount is smaller than the threshold, the control unit controls the image processing unit to acquire second correction information corresponding to the information on image deterioration acquired with the second amount of calculation and perform the image processing on the image of the virtual object on a basis of correction information included between the first correction information and the second correction information.

9. The image processing device according to claim 1, wherein
   the control unit controls the threshold according to characteristics of an optical system of the imaging device.

10. An image processing method comprising:
controlling a display device to display a composite image obtained by combining an image of a virtual object with a captured image captured by an imaging device;
acquiring a combination position for combining the image of the virtual object in the captured image;
performing image processing on the image of the virtual object, the image processing being based on information on image deterioration of the captured image at the combination position; and
controlling the image processing according to a motion amount of the display device, wherein
in a case where the motion amount of the display device is smaller than a threshold, the image processing is controlled to acquire the information on image deterioration of the captured image at the combination position with a first amount of calculation, and
in a case where the motion amount of the display device is larger than the threshold, the image processing is controlled to acquire the information on image deterioration of the captured image at the combination position with a second amount of calculation that is smaller than the first amount of calculation.

11. A non-transitory computer readable medium that stores a program, wherein the program causes a computer to execute an image processing method comprising:
controlling a display device to display a composite image obtained by combining an image of a virtual object with a captured image captured by an imaging device;
acquiring a combination position for combining the image of the virtual object in the captured image;
performing image processing on the image of the virtual object, the image processing being based on information on image deterioration of the captured image at the combination position; and
controlling the image processing according to a motion amount of the display device, wherein
in a case where the motion amount of the display device is smaller than a threshold, the image processing is controlled to acquire the information on image deterioration of the captured image at the combination position with a first amount of calculation, and
in a case where the motion amount of the display device is larger than the threshold, the image processing is controlled to acquire the information on image deterioration of the captured image at the combination position with a second amount of calculation that is smaller than the first amount of calculation.

* * * * *